United States Patent Office 2,945,759
Patented July 19, 1960

2,945,759
METHOD FOR MEASURING THE STRENGTH OF SINTERED FERROUS ARTICLES

Arthur R. Shaw and Frederick W. Sampson, Dayton, Ohio, assignors to General Motors Corporation, Detroit, Mich., a corporation of Delaware No Drawing. Filed Sept. 19, 1957, Ser. No. 684,853

4 Claims. (Cl. 75—201)

This invention relates to a method for making friction elements and is particularly concerned with a method for making strong ferrous friction elements which include high percentages of graphite therein.

It is an object of the invention to provide a method for making a ferrous friction element consisting essentially of iron with graphite in quantities ranging from 20 to 32% by weight of the element and wherein the element has good strength.

In carrying out the above object, it is a further object to provide a method for making a friction element comprising iron and graphite wherein two types of graphite are used as the graphite component which component yields greater strength without laminations in the finished element than a like element made with only one type of graphite.

Another object of the invention is to provide a method for making strong ferrous friction elements including graphite between 20 and 32% wherein the graphite is a combination of powdered graphite and flake graphite in specific proportions to yield satisfactory fiber strength in the finished article without a tendency toward flaking or stratification.

Further objects and advantages of the present invention will be apparent from the following description wherein preferred embodiments of the present invention are clearly shown.

In copending application, S.N. 684,954, filed concurrently herewith, now abandoned and assigned to the assignee of the present invention, a friction material is set forth which basically comprises a mixture of iron and graphite with other ingredients wherein the graphite ranges from 20 to 30% by weight of the element which element forms a highly desirable brake or clutch.

Elements of this character also include lubricant metals such as lead or bismuth, etc., and may likewise include an additional metal or metals such as small quantities of copper to further strengthen the element.

It is impossible to manufacture elements of this character by normal procedures that have sufficient strength for their intended use when the graphite content of the element exceeds 25%. In fact, it has been found that, when such an element is made from metal powders with powered graphite, the fiber strength thereof is relatively low, in fact, so low as to make the element substantially useless for its intended purpose. On the other hand, when flake graphite is used in place of powdered graphite the element has sufficient strength so far as its fiber stress is concerned, but is lamellar in structure and flaskes off in large flakes due to the stratified structure of the element. Therefore, neither of these elements provides a satisfactory brake element.

We have found that by choosing suitable combinations of powdered graphite and flake graphite, it is possible not only to improve the fiber strength of the element but likewise to eliminate the stratification or lamellar structure thereof whereby the finished element is of a strength sufficient to be useful for its intended purpose without a tendency to flake off and wherein the finished article has similar frictional characteristics as the same article made from either flake graphite or powdered graphite.

A specific example of such a material is set forth as follows wherein all the parts noted are parts by weight:

Example 1

67 parts —250 mesh sponge iron powder
15 parts powdered artificial graphite (density 1.85 grams per cc., —325 mesh)
15 parts coarse flake natural graphite (density about 2.1 grams per cc., 20 to 30 mesh)
8 parts 150 mesh copper powder
5 parts 100 mesh bismuth powder These ingredients are intimately mixed and briquetted at 70,000 pounds per square inch and sintered for about 40 minutes in a nonoxidizing atmosphere at a temperature of about 1800° F. The resulting friction element has a fiber strength in the order of 3045 pounds per square inch.

Example 2

67 parts —250 mesh sponge iron powder
10 parts powdered artificial (density 1.85 grams cc., —325 mesh)
20 parts coarse flake natural graphite (density about 2.1 grams per cc., 20 to 30 mesh)
8 parts 150 mesh copper powder
5 parts 100 mesh bismuth powder These ingredients are intimately mixed and briquetted at 70,000 pounds per square inch and sintered for about 40 minutes in a nonoxidizing atmosphere at a temperature of about 1800° F. The resulting friction element has a fiber strength in the order of 3155 pounds per square inch.

Example 3

67 parts —250 mesh sponge iron powder
20 parts powdered artificial graphite (density 1.85 grams per cc., —325 mesh)
10 parts coarse flake natural graphite (density about 2.1 grams per cc., 20 to 30 mesh)
8 parts 150 mesh copper powder
5 parts 100 mesh bismuth powder These ingredients are intimately mixed and briquetted at 70,000 pounds per square inch and sintered for about 40 minutes in a nonoxidizing atmosphere at a temperature of about 1800° F. The resulting friction element has a fiber strength in the order of 2256 pounds per square inch.

In each of the above examples, the bismuth and copper powder may be left out of the formulation if desired providing the element has useful frictional properties for its intended application, the important ingredients being iron and graphite.

We have further found that the mixtures of different types of graphite in the graphite ingredient may vary from 16⅔% of the powdered graphite to 16⅔% of the flake graphite with the remainder in each case being the other type. It has been found that the fiber strength of the article when the powdered graphite exceeds 83⅓% is too low, being in the order of 1800 pounds, while the flaking tendency of the material when the flake graphite exceeds 83⅓% becomes excessive. Thus, mixtures ranging from 83⅓% of one to 16⅔% of the other with equal proportions being preferred are the most useful mixtures.

In all cases, the friction element made from this mixture of iron and graphite with or without additional materials is preferably briquetted directly onto a more dense and strong ferrous layer wherein the two layers can be sintered simultaneously. The manufacture of such a composite element is fully described in copending application, S.N. 596,266, assigned to the assignee of the present invention wherein any of the friction layer formulations set forth in this application may be used in connection with the more dense material.

Similarly, where other attachment means are desired, it is possible to sinter and bond the friction material described herein within a cup or retainer such as is clearly shown in copending application, S.N. 684,954, hereinbefore referred to.

While the present invention is an essential and necessary procedure in order to obtain satisfactory strength and physical characteristics when making friction elements containing 25% and above of graphite, the same procedure can be used in making friction elements containing lower amounts of graphite, for example, from 20%–25% by weight. In this instance, the fiber strength of the finished article will be improved through the use of the procedures set forth.

While the embodiments of the present invention as herein disclosed constitute preferred forms, it is to be understood that other forms might be adopted.

What is claimed is as follows:

1. In a method for increasing the strength of sintered ferrous articles made from briquetted and sintered metal powder including graphite in quantities of from 20% to 32% by weight, the step of adding graphite in quantities of from 20% to 32% by weight to the metal powder prior to briquetting and sintering, consisting of; a mixture of powdered artificial graphite of −325 mesh and natural flake graphite of 20 to 30 mesh wherein proportions of one of said graphite components varies between 16⅔% to 83⅓% by weight of the total graphite mixture with the other component making up the remainder.

2. In a method for increasing the strength of sintered ferrous articles made from briquetted and sintered metal powder including graphite in quantities of from 20% to 32% by weight, the step of adding graphite in quantities of from 20% to 32% by weight to the metal powder prior to briquetting and sintering, consisting of; a mixture of powdered artificial graphite of −325 mesh and natural flake graphite of 20 to 30 mesh wherein said graphite components are mixed in substantially equal proportions.

3. In a method for increasing the strength of sintered ferrous articles made from briquettted and sintered metal powder including graphite in quantities of from 25% to 30% by weight, the step of adding graphite in quantities of from 25% to 30% by weight to the metal powder prior to briquetting and sintering, consisting of; a mixture of powdered artificial graphite of −325 mesh and natural flake graphite of 20 to 30 mesh wherein proportions of one of said graphite components varies between 16⅔% to 83⅓% by weight of the total graphite mixture with the other component making up the remainder.

4. In a method for increasing the strength of sintered ferrous articles made from briquetted and sintered metal powder including graphite in quantities of from 25% to 30% by weight, the step of adding graphite in quantities of from 25% to 30% by weight to the metal powder prior to briquetting and sintering, consisting of; a mixture of powdered artificial graphite of −325 mesh and natural flake graphite of 20 to 30 mesh wherein said graphite components are mixed in substantially equal proportions.

References Cited in the file of this patent
UNITED STATES PATENTS

| | | |
|---|---|---|
| 2,348,315 | Vaughan | May 9, 1945 |
| 2,416,830 | Heuberger | Mar. 4, 1947 |
| 2,645,583 | Stanko | July 14, 1953 |
| 2,784,105 | Stedman et al. | Mar. 5, 1957 |
| 2,863,211 | Wellman | Dec. 9, 1958 |